US006345570B1

United States Patent
Santi

(10) Patent No.: US 6,345,570 B1
(45) Date of Patent: Feb. 12, 2002

(54) DEVICE FOR FEEDING PRECOMPRESSED SINGLE-SERVING PODS IN MACHINES FOR THE PRODUCTION OF ESPRESSO COFFEE BEVERAGES

(75) Inventor: Giuseppe Santi, Bologna (IT)

(73) Assignee: Euromatik S.r.l., Bologna (IT)

( * ) Notice: Subject to any disclaimer, the term of this patent is extended or adjusted under 35 U.S.C. 154(b) by 0 days.

(21) Appl. No.: 09/564,692

(22) Filed: May 3, 2000

(30) Foreign Application Priority Data

May 4, 1999 (IT) ........................................ BO99A0215

(51) Int. Cl.⁷ ................................................ A47J 31/24
(52) U.S. Cl. ...................... 99/289 R; 99/295; 99/302 P
(58) Field of Search ............................. 99/295, 289 R, 99/289 P, 302 P, 302 R

(56) References Cited

U.S. PATENT DOCUMENTS 3,260,190 A * 7/1966 Levinson ..................... 99/295

5,111,740 A * 5/1992 Klein ........................... 99/295
5,974,950 A * 11/1999 King ........................ 99/289 R

FOREIGN PATENT DOCUMENTS

EP 00041931 * 12/1981 ............... 99/289 R

* cited by examiner

Primary Examiner—Reginald L. Alexander
(74) Attorney, Agent, or Firm—Cohen, Pontani, Lieberman & Pavane

(57) ABSTRACT

A device for feeding precompressed single-serving pods of ground coffee in machines for the production of espresso coffee beverages, includes a reciprocatably retractable drawer incorporating a lower pod support and pod retaining member which are disengaged from the drawer during movement of the drawer and activated and are deactivated in phase with the retraction of the drawer.

17 Claims, 5 Drawing Sheets

DEVICE FOR FEEDING PRECOMPRESSED SINGLE-SERVING PODS IN MACHINES FOR THE PRODUCTION OF ESPRESSO COFFEE BEVERAGES

BACKGROUND OF THE INVENTION

1. Field of the Invention

The present invention relates to espresso coffee machines and, more particularly, to such machines that utilize single-serving pods or pouches of coffee for use in preparing single servings of espresso beverages.

2. Description of Related Art

In machines for the production of espresso coffee beverages, it is known to use prefilled pouches or "pods" insertable into the machine to provide the raw materials from which the beverage is prepared. Such pods typically comprise precompressed, single servings of ground coffee that are enclosed in filter paper and packaged with one or more outwardly extending strips or marginal extensions of material that are graspable for feeding of the pouches to automated devices, or for separate or manual use, and some of the marginal strips are fabricated with predetermined break or tear points. The device of the present invention is one that utilizes such pods that are manually inserted into the machine by a user.

OBJECTS AND SUMMARY OF THE INVENTION

The principal object of the present invention is to provide a device that accepts manual insertion or feeding of single-serving pods and automatic removal and discharge of spent pods at the end of the operating cycle of an espresso coffee beverage machine. The invention permits the construction of advantageously simple and economical espresso machines for personal use for the production of espresso coffee beverages, in which the manual nature of the feed is substantially confined to the positioning of a new pod in the machine.

It is another object of the invention is to provide such a device which is constructed and engineered in a particularly simple and robust manner and which can be actuated manually or automatically, in the latter case by using any of a broad range of known or otherwise suitable arrangements.

It is a further object of the invention to achieve these objects in a device that can be readily combined and integrated with the components that form such machines, as for example heretofore known, for the production of espresso coffee beverages.

Still another object of the invention is to provide a simple, functional and efficient device, reliable in operation and relatively economical in cost, for achieving the desired functionality.

These and other, additional objects are achieved in the inventive device for feeding precompressed single-serving pods in machines for the production of espresso coffee beverages. The device of the invention includes an extendibly retractable drawer that incorporates a lower pod support and opposable pod retaining means which are disassociable or disengageable from the drawer during travel of the drawer and are automatically activated and deactivated in phase with the retraction or travel of the drawer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the device according to the present invention will be more clearly apparent from the detailed description which follows of preferred but nonetheless nonexclusive embodiments thereof, shown by way of example only and without limiting effect in the drawings, in which.

DETAILED DESCRIPTION OF THE CURRENTLY PREFERRED EMBODIMENTS

Figure 1:
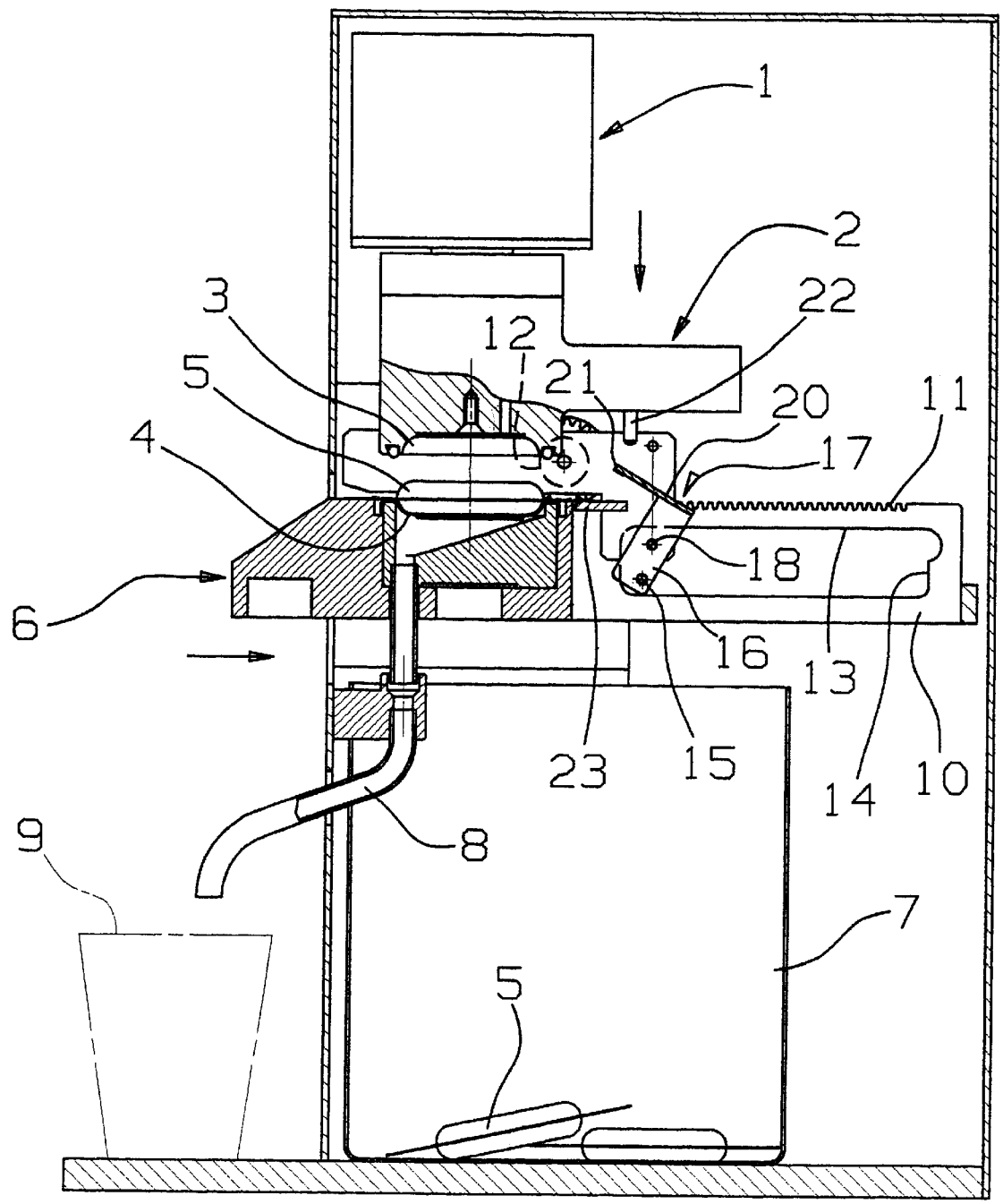
FIG. 1 is a cross-sectional side view of a machine for the production of espresso coffee beverages incorporating a device for feeding and retention of pods in accordance with the present invention and shown with the drawer of the device in its fully seated or normal operating position for preparing a serving of an espresso coffee beverage.
Figure 1A:
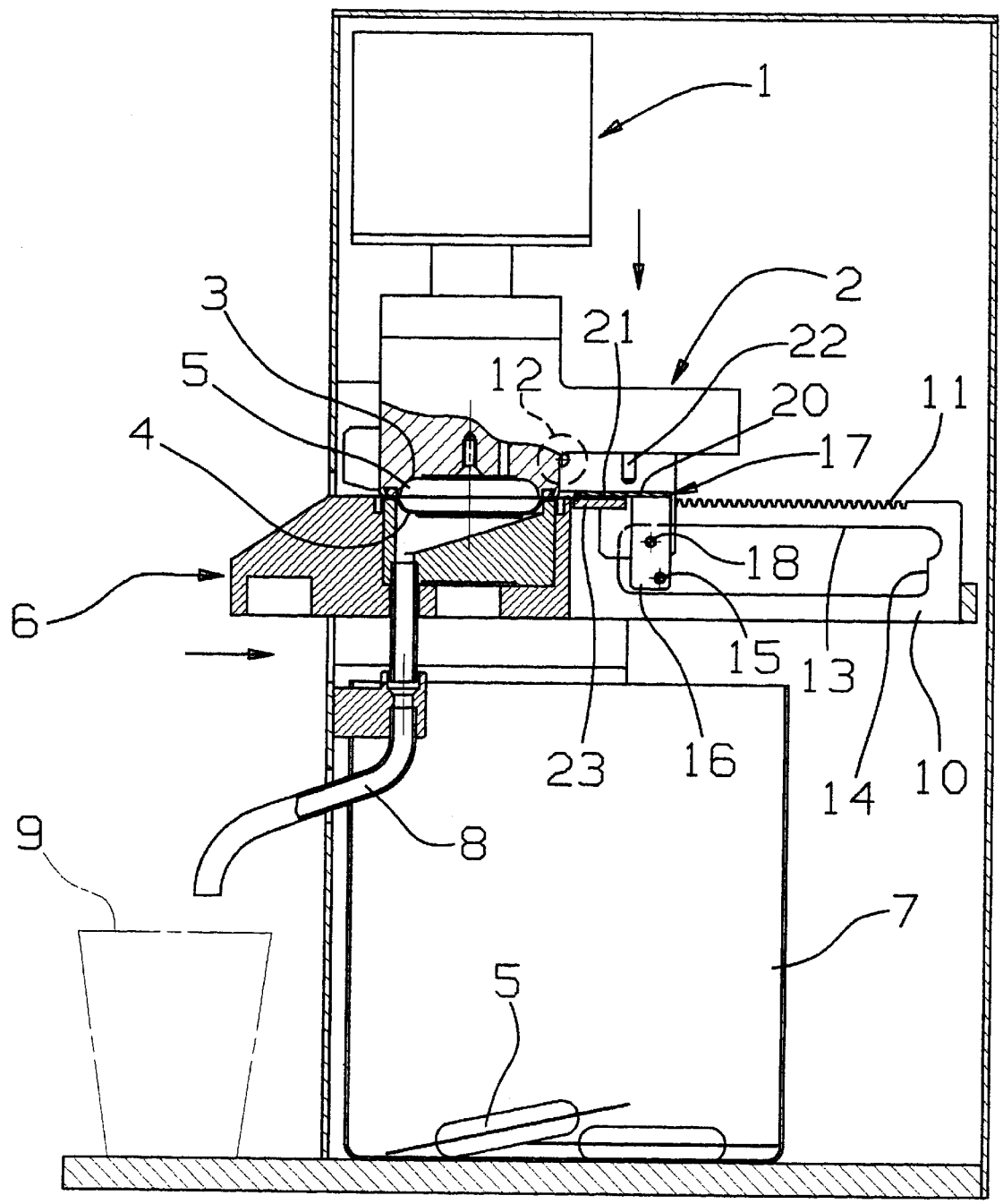
FIG. 1A is a cross-sectional view similar to FIG. 1 but showing the drawer of the device in a partially extended position.

With reference now to the Figures, and in particular to FIG. 1 thereof, general reference numeral 1 designates as a whole the upper turret of a machine for the production of espresso coffee beverages. The machine is formed, in a manner generally known in the art, by a multiplicity of mechanisms, devices and pipes including a vertically sliding assembly identified by the general reference numeral 2 and for providing functionality for operative translational movement of the assembly 2 during the pressurization stroke of the machine in which the espresso drink product is produced from a pod 5. The pod 5 typically comprises a precompressed, premeasured single serving of ground coffee enclosed between two generally quadrilaterally or otherwise shaped sheets of filter paper joined together inwardly of their peripheral edges to form a pouch or capsule with flat, sheet-like, marginal extensions projecting outward from the peripheral edges of the pouch. In use, the pod 5 is held between a lower pod support shell 4 on which the pod rests and an upper pod support shell that is vertically moveable with the assembly 2 to enclose the pod between the upper and lower shells.

The lower pod support shell 4 is recessed into a pull-out drawer 6 that is located (in the machine's operating—i.e. the espresso beverage producing—position shown in FIG. 1) above a collecting box 7 for spent pods 5 and is connected to piping 8 for passing the prepared beverage to a consumption receptacle such, for example, as a disposable cup 9 positioned on the base at the front of the machine.

In accordance with the invention, the drawer 6 is provided at its rearward or interior end portion with parallel lateral appendages or guides 10 (see also FIG. 3), on the top of one of which a longitudinal segment of rack 11 is provided. The rack 11 is engageable with a drivewheel or other meshing arrangement of an electric motor 12 that is operable for reciprocally translating the drawer between its FIG. 1 closed or operation condition and its FIG. 2 open or pod-replacement position.

Figure 4:
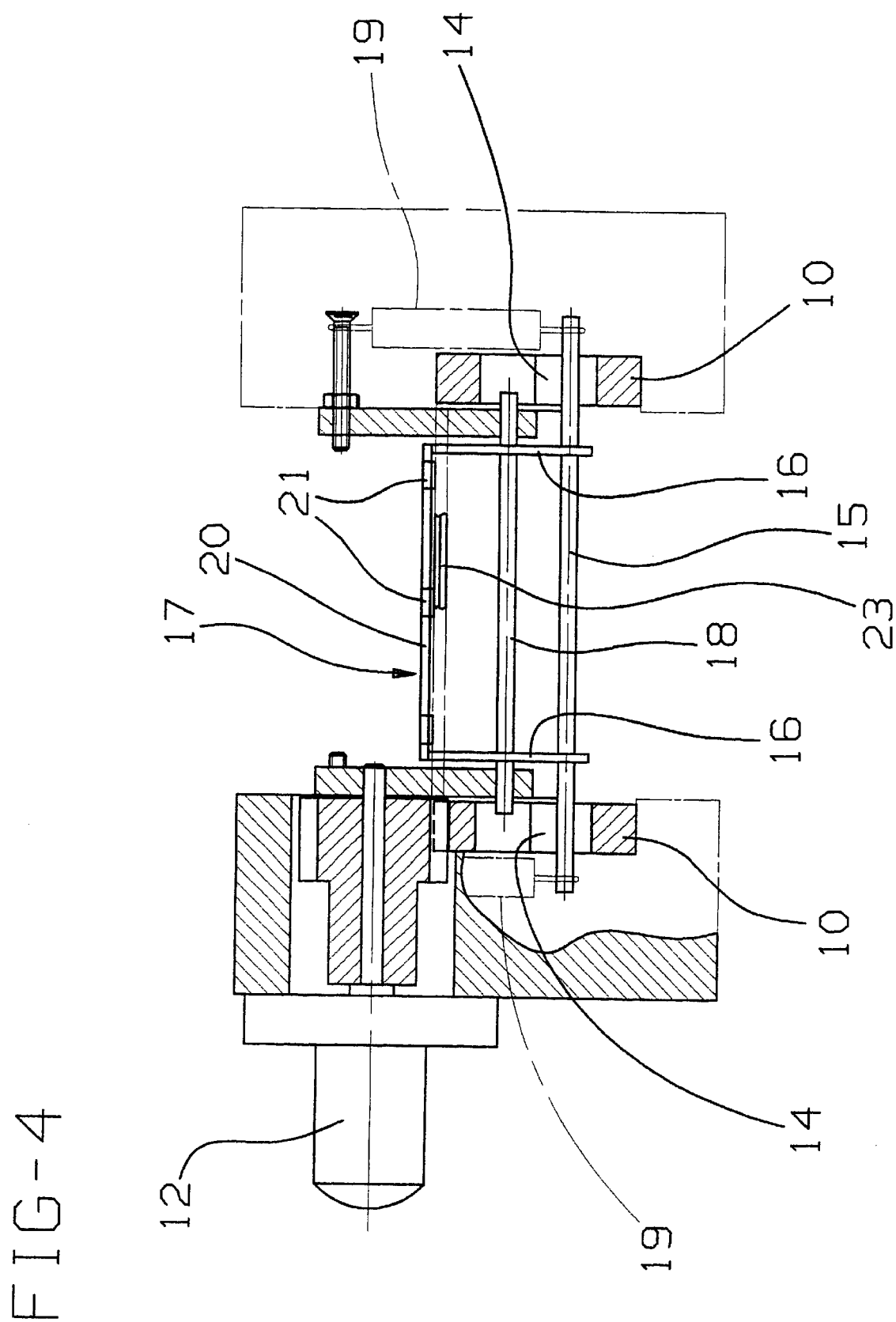
FIG. 4 is a detailed frontal sectional view of the pod feeding device of the invention.

The parallel lateral guides 10 define respective longitudinal symmetrical slots 13 that include a lower projection 14 at their rear or distal ends, and through the aperture of which slots there projects a pin 15 at a level appropriate to engage with the projection 14. The pin 15 connects and extends between the bottoms of a pair of parallel levers 16 which are pivotable to actuate a "pincer" assembly 17 (see also FIG. 4) for associated functions described hereinbelow.

Each lever 16 pivots about a fulcrum 18 which is fixed relative to the vertical travel of upper pod support shell 3 and to the horizontal travel of lower pod support shell 4, and exhibits two directions or angles of pivotal elasticity and return urgency about fulcrum 18 in respectively differing, or at least separately defined, amounts determined by lateral springs 19.

The levers 16 are additionally connected at their tops by a crossbar 20 that carries three proximal prongs 21 (FIG. 3) for engagement with a lower projection 22 of sliding assembly 2 in a raised position of the crossbar and for pressing contact with or abutment against a positionally fixed (relative to drawer 6) bracket 23 disposed in the same plane as that of lower pod support shell 4, for purposes that will hereinafter become clear.

Use and dynamic operation of the inventive assembly in the espresso machine will now be described. To initiate use of the inventive assembly, the drawer 6 is advanced or moved outwardly to its pod feeding or loading position seen in FIG. 3. Such movement of the drawer, as from its FIG. 1 to its FIG. 3 position, may be effected (and initiated, as desired and under the control of the user) in any suitable or convenient manner. In the embodiment of the espresso machine depicted in the drawings, the motor 12 is operated to drive the drawer, through engagement with the rack 11, fully outward to its FIG. 2 position.

In this position of the drawer, a new or unused pod 5, which may for example be selected by the user from a package or dispenser of such pods, is placed by the user on the lower pod support shell 4. The drawer 6 is then caused to slide inwardly, as for example by operation of the motor 12 in response to a stimulus or command provided by the user.

At this point, the espresso coffee beverage production cycle as such may take place. This cycle involves downward movement, actuated automatically or manually in any known or otherwise-provided manner, of the sliding assembly 2 and the subsequent pressurization stroke of the upper pod support shell 3 onto the lower pod support shell 4 by means of which the pod 5 is trapped therebetween. A flow of heated water is then brought to sufficient pressure to permeate the pod and, becoming thus charged with coffee essence, is discharged or directed into the consumption container 9 through the piping 8. Such actions to prepare the espresso beverage are well known and widely practiced.

In its downward movement, and in accordance with the invention, the sliding assembly 2 engages with the crossbar 20 of pincer 17. This engagement effects rotation of the levers 16 about fulcrums 18 against the first angle or direction of elasticity thus trapping and capturing, between and by means of prongs 21 against the stop provided by bracket 23, the marginal extensions of the filter paper of the pod 5. It will thus be recognized that in placing a pod 5 into the lower pod support shell 4, the pouch or capsule of the pod is positioned in the concave depression of the shell 4—which is preferably sized to so receive the capsule—and the marginal extensions of the pod project outwardly beyond the shell depression. The marginal extension of the pod is thereby positioned, with the drawer 6 in its operating or FIG. 1 position, over and atop the bracket 23 against which it is subsequently trapped or confined, as described above, by the prongs 21 of pincer 17.

Figure 2:
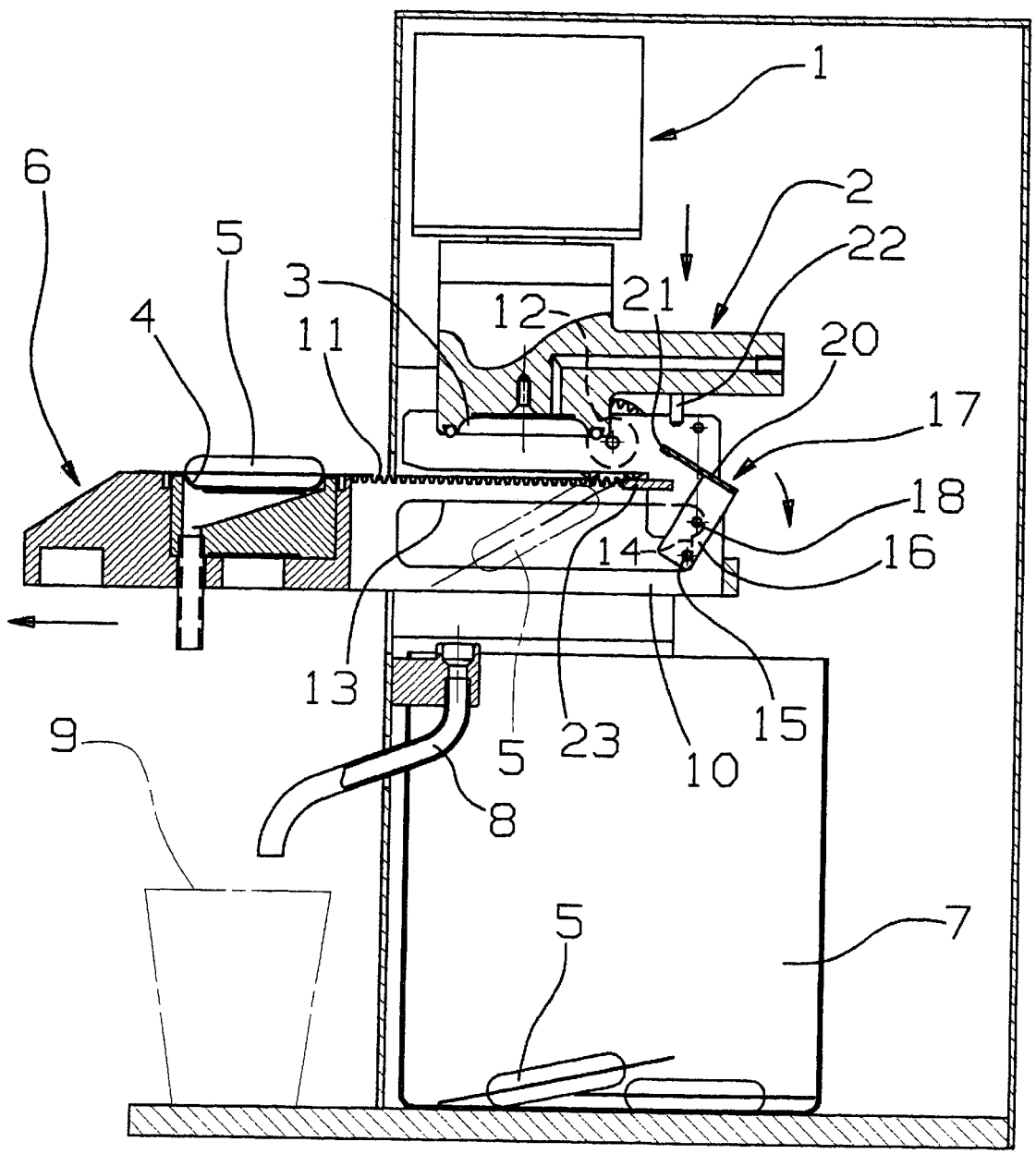
FIG. 2 is a cross-sectional view similar to FIG. 1 but showing the drawer of the device in its full extended position.
Figure 3:
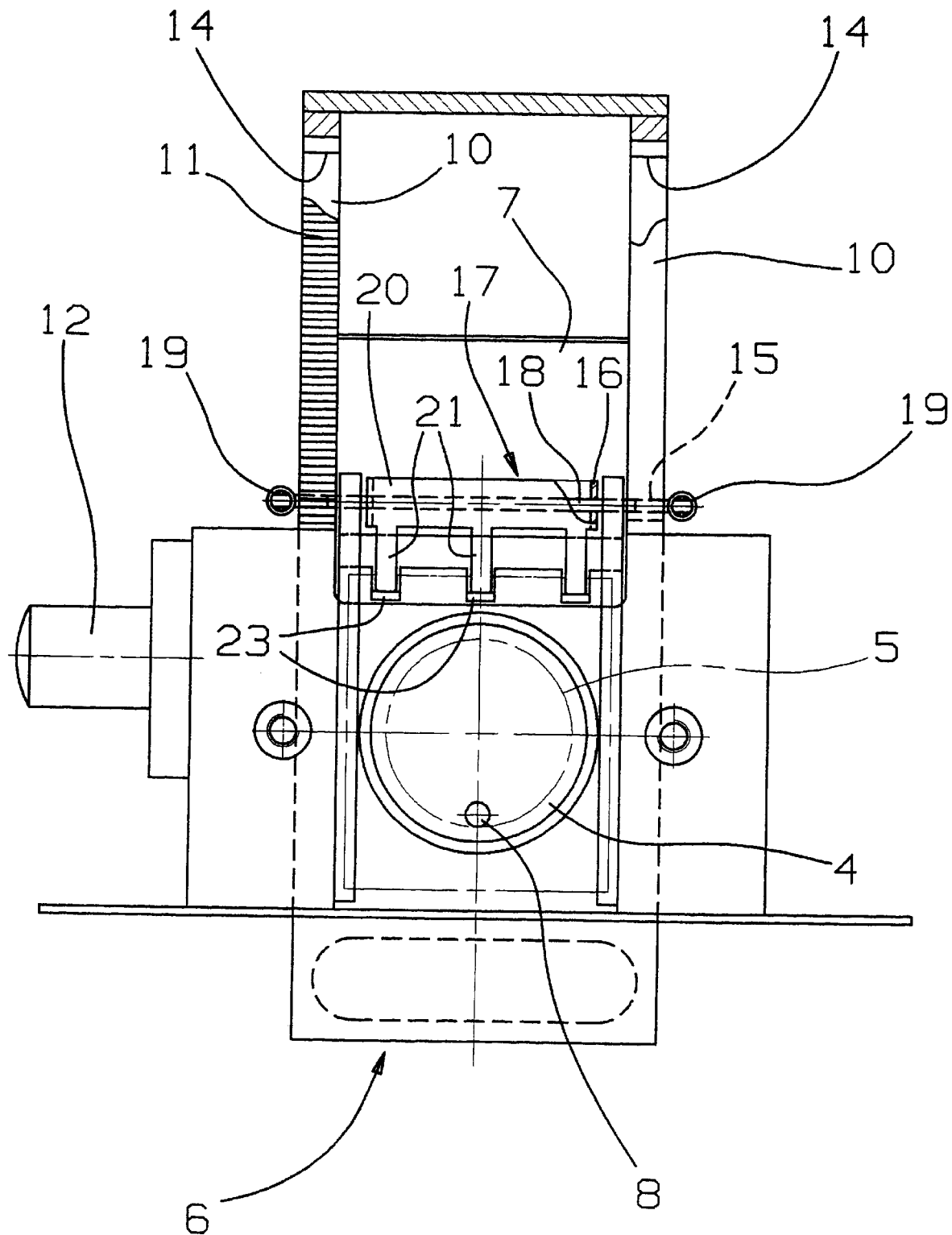
FIG. 3 is a top plan view of the pod feeding device of the invention.

On completion of the beverage production phase of operation of the espresso machine, the sliding assembly 2 is raised and the pod 5 remains positioned on the lower pod support shell 4, still engaged by the prongs 21 of pincer 17 until a next subsequent drawer-opening movement of drawer 6 from its FIG. 1 to its FIG. 2 position to begin a new beverage production cycle.

Accordingly, as the drawer 6 is next moved or displaced outwardly to its loading position, the spent pod S remains in place, trapped by the capture of its marginal extension between the prongs 21 of pincer 17 and the surface of fixed bracket 23. When the support of the pod capsule supplied by lower pod support shell 4 is completely removed by the outward displacement of drawer 6, it is caused under gravitational forces to hang down into the open space formally occupied by the lower shell 4 and other portions of drawer 6 (see FIG. 2).

Upon the completion of the outward travel of drawer 6 to its FIG. 2 loading position, in which the distal ends of the slots 13 of parallel guides 10 are carried to their leftmost (in the drawings) position, the projections 14 press against the lower linking pin 15 of the levers 16, causing the levers to pivot about their fulcrums 18 against the second or opposite direction or angle of elasticity. As a consequence the prongs 21 are thereby released from their pressing engagement against the fixed bracket 23, correspondingly releasing the theretofore captured marginal extensions of the pod 5 from between the prongs 21 and bracket 23 and thereby permitting the spent or used pod to fall into the collecting box 7 provided at the bottom of the espresso machine for receiving and collecting spent pods. This then clears the track for the drawer 6 to permit the return of the drawer to its FIG. 1 position for a new production cycle.

As should be apparent, numerous modifications and alternate embodiments of the device and construction thus far described may be made and implemented in accordance with the invention. All such modifications and changes, so long as they are directed to providing the advantages and functionality that are what those skilled in the art will now recognize as forming the basis of applicant's invention, are within the intended scope and contemplation of the invention. Thus, and by way of illustrative example, the automatic drawer travel means may alternatively be designed, positioned and/or implemented in any desired manner appropriate for achieving the operative functionality described and discussed hereinabove. The drawer may alternatively be adapted for manual displacement by provision of a simple gripping means on the front thereof. The rear lateral guides herein described may be replaced by any assembly or shaped arrangement of elements suitable for engagement with or like operation of the pincer opening means at the end of travel of the drawer to place the drawer in its extended or loading position.

In addition, the closure of the pincer, instead of being effected or initiated by downward movement of the upper sliding assembly, may alternatively be actuated by the rear lateral guides, as for example through appropriate configuring of the guides with a slot that is shaped proximally as a mirror image of the distally-defined configuration of the preferred embodiment hereinabove disclosed. Moreover, in accordance with the solution-based concept of the invention, both the closing and opening movements of the pincer may alternatively be actuated by any construction or device or agency or means, and appropriately timed, in any manner suitable to provide the desired operative functionality.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for feeding pods containing material from which a beverage is prepared into machines for production of beverages, comprising a reciprocatably movable drawer incorporating a lower pod support and pod retaining means, said pod retaining means being separated from the drawer during movement of the drawer and arranged for activation to a pod gripping state and deactivation to a pod non-gripping state, said activation and deactivation occurring in phase with horizontal travel of the drawer.

2. The device as claimed in claim 1, wherein said retaining means are actuated to retain said pod for a phase which begins at any stage subsequent to the completion of the closure of said drawer and in any case extends almost until the end of the operating of said drawer.

3. The device as claimed in claim 1, comprising an upper pod support for movement toward and away from said lower pod support, wherein the lower pod support is equipped with means adapted to deactivate, in a retraction phase of said drawer, pod retaining means actuated by a pressurization stroke of the upper pod support.

4. The device as claimed in claim 1, comprising an upper pod support for movement toward and away from said lower pod support, said lower pod support being equipped with a rear appendage adapted to engage, in a retraction phase of said drawer, opening means of a pincer having two angles of elasticity for the retention of a pod clamped by a pressurization stroke of the upper pod support.

5. The device as claimed in claim 1, comprising:
   a sliding assembly incorporating an upper pod support shell moved during a pressurization stroke onto a lower pod support shell of said lower pod support;
   a drawer equipped with at least one guide provided with a distally shaped longitudinal slot having a lower projection;
   actuating means introducing themselves into said slot of at least one lever having two angles of elasticity and equipped with means adapted to interfere with said sliding assembly in a raised position and to fall back onto fixed stop means in the same plane as said lower pod support shell.

6. The device as claimed in claim 1, comprising
   a sliding assembly incorporating an upper pod support shell moved during a pressurization stroke onto a lower pod support shell of said lower pod support;
   a drawer equipped at the rear with two parallel guides provided with respective longitudinal slots distally shaped with respective lower projections; and
   lower coupling means introducing themselves into said slots of two parallel levers having two angles of elasticity and paired at the top by a crossbar adapted to interfere with said sliding assembly in a raised position and to fall back on fixed stop means in the same plane as said lower pod support shell.

7. The device as claimed in claim 6, wherein said levers have a fulcrum which is fixed relative to the vertical travel of said upper pod support shell and to the horizontal travel of said lower pod support shell.

8. The device as claimed in claim 6, wherein said levers are designed to have two angles of elasticity relative to said fulcrum by means of lateral springs.

9. The device a claimed in claim 6, wherein said levers are paired at the top by a crossbar provided with prongs and adapted to interfere with said sliding assembly in a raised position and to fall back on a fixed bracket in the same plane as said lower pod support shell.

10. The device as claimed in claim 6, wherein said lower pod support shell recessed in said drawer is positioned above a collecting box for spent pods and is connected to piping for passing the prepared beverage to a consumption receptacle.

11. The device as claimed in claim 6, wherein a longitudinal segment of a rack engaged by an electric motor is machined on the top of one of said guides.

12. The device as claimed in claim 1, comprising automatic travel means of said drawer designed and/or constructed and/or positioned in any manner suitable for the purpose.

13. The device as claimed in claim 1, wherein said drawer is designed to be manually operated by gripping means on its front and arrangements adapted to require the user to complete the entire associated retraction travel.

14. The device as claimed in claim 6, wherein said rear lateral guides are alternatively constituted by any desired shaped mechanism adapted to engage means for opening said pincer at the end of retraction travel of said drawer.

15. The device as claimed in claim 6, wherein the closure of a pincer disposed for retention of the pod is also actuated by said rear lateral guides, provided for the purpose with a slot that is shaped proximally in a manner that is the mirror image of the associated distal shaping.

16. The device as claimed in claim 4, wherein the closing of said pincer is actuated by the agency of any means of any kind suitable for the purpose.

17. The device as claimed in claim 4, wherein the opening of said pincer is actuated by the agency of any means of any kind suitable for the purpose.

* * * * *